Feb. 6, 1934.　　　H. KÖNEMANN　　　1,946,404
REPRODUCTION OF SOUND FROM SOUND FILM RECORDS
Filed Nov. 27, 1931
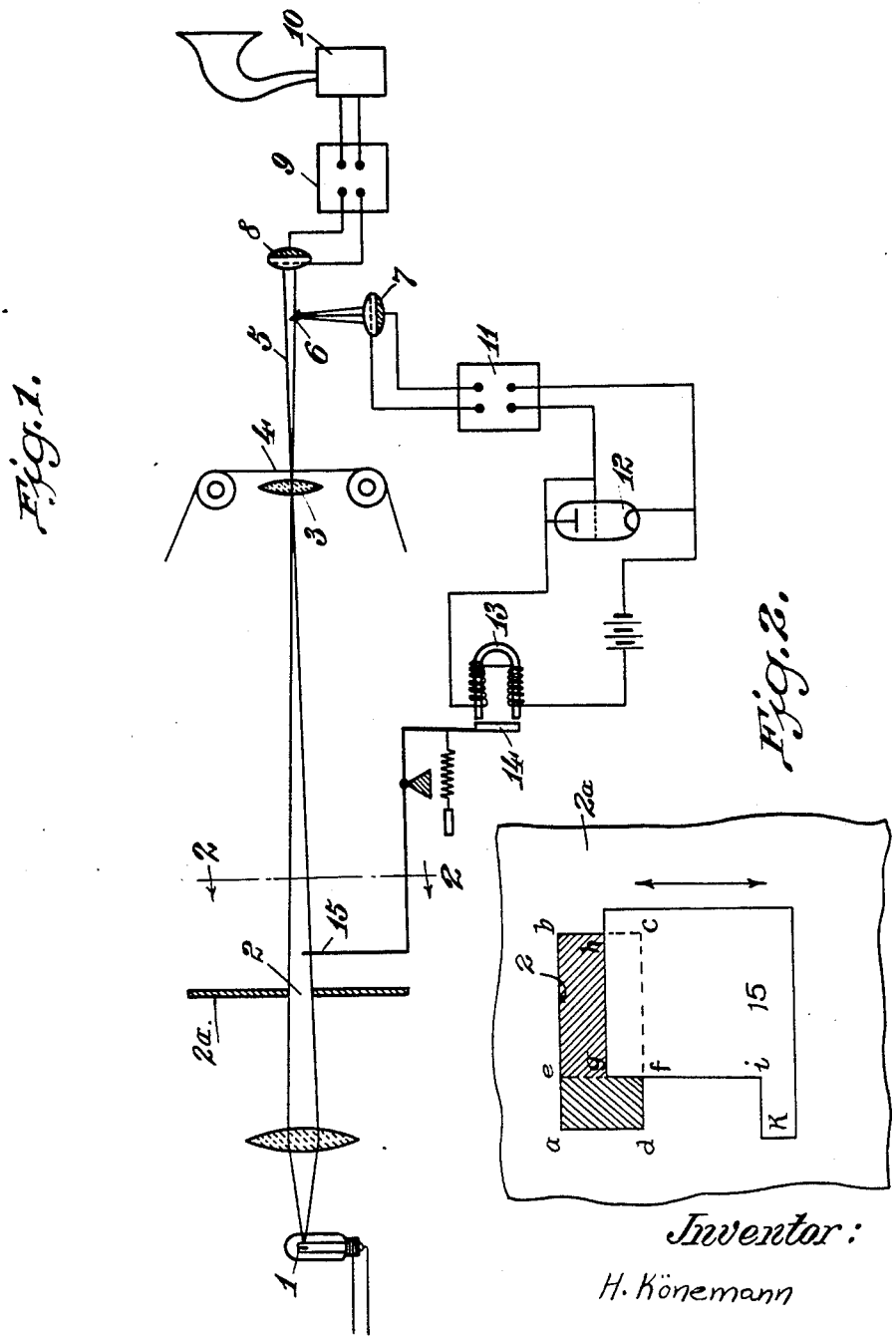
Inventor:
H. Könemann
By Marks & Clerk
Att'ys.

Patented Feb. 6, 1934

1,946,404

UNITED STATES PATENT OFFICE 1,946,404

REPRODUCTION OF SOUND FROM SOUND FILM RECORDS

Heinrich Könemann, Munster, Germany

Application November 27, 1931, Serial No. 577,589, and in Germany December 4, 1930

6 Claims. (Cl. 179—100.3)

In the variable intensity process of recording of scound films, excessively blackened portions in the sound spectrum are preferably avoided because they involve the danger of distortion. However, this is accompanied by the disadvantage that the volume of sound does not vary to the desired extent during reproduction, and therefore the expedient is employed of modulating the reproduction electrically and so regulating the volume of sound.

It has also been proposed to regulate the volume of sound during reproduction by employing screening means of any type to regulate the quantity of light controlled by the moving film and falling upon the photo-electric cell. This may be done by covering or blackening over the sound strip for about a half or one quarter of its width, the amplification ratio thus adjusted being maintained for some time, about one scene long.

In the reproduction of sound films, it is known to regulate the volume of sound by regulating the quantity of light falling upon the photo-electric cell.

In electro-optical sound recording and sound reproducing apparatus, it is also known for control purposes, to separate a portion of the modulated pencil of light by optical means, and to feed it to the elements employed for observation.

It is further known to control a screen by means of a ray of light modulated by a film provided with transverse recording in such a manner that the shadow of the said screen covers the strip of film left free from sound record in order thereby to keep down the disturbing secondary noises, which are readily produced by blank places on the film.

In contradistinction thereto, according to the invention the quantity of light, which falls on the photoelectric cell controlling the loudspeaker is automatically regulated by the sound spectrum itself in proportion to the magnitude of the amplitude of the vibration recorded on the film and is thus varied from moment to moment and adjusted individually for each point on the sound strip. The method of effecting this consists in separation from the cross-section of the pencil of light, which has passed through the film, a definite small part and in converting the light thus diverted into electrical oscillations, amplifying and rectifying the latter independently and utilizing the fluctuations of the rectified current thus formed in order to control a shielding or screening device which screens off more or less of the rest of the light directed towards the photo-electric cell according to the size of the sound-blackened portions of the film which are passing the slit.

A constructional example of a light-controlling device according to the invention is shown in the accompanying drawing.

Figure 1 is a diagrammatic view of the arrangement of the several parts.

Figure 2 is a diagrammatic constructional view substantially on line 2—2 of Figure 1.

The rays of light from the light source 1 pass through a slit 2 of the light-tight wall 2ª to the objective 3 which forms an image of the slit 2 on the film 4. The pencil of rays 5 passing through the film are caught in part by a prism 6 and reflected upon a photo-electric cell 7, which converts the light it receives into electrical oscillations. The rays which are not intercepted pass to the photo-electric cell 8. The electrical oscillations produced there are amplified in the amplifier 9 and fed to the loudspeaker 10. The oscillations which leave the cell 7 are amplified in 11 and rectified in 12. The direct current impulses coming from the rectifier 12 are fed to the magnet 13 which is energized by them and which attracts more or less strongly the armature 14 controlled by a tension spring. The armature is connected by a lever to a screening device 15 which allows the light passing through the slit 2 to pass on more or less according to the extent to which the screening device is influenced by the electromagnet 13, 14, namely, in such a way that the screening device allows more light to pass through, the more strongly the cell 7 is excited.

For this purpose, any type of screening device or light gate controlled by the light which is separated, may be employed.

The rays of light passing through the slit 2 may be considered as constituting a beam of two parts. The area $e, b, c, f$ permits the passage of rays of light for incidence upon the film 4 and thence to the photo-electric cell which governs the operation of the loud speaker 10 in the usual way. This part of the light beam is modified by the operation of the screen 15 which at its upper edge $g$—$h$ cuts off more or less of this part of the beam. The other part of the beam, located to the left of the left hand edge $g$—$f$ of shutter 15 in Figure 2, and constituting the portion passing through the area $a, e, f, g$ of the slit 2 is not affected by the position of the shutter 15, as the shutter is illustrated as cut away above the shoulder $k, i$ for providing an opening or notch to permit the unobstructed passage of such other part of the light beam for incidence upon the film and deflection by the prism 6, so that it may control the photo-electric cell 7. The movement of the shutter 5 in either direction, as shown by the double-headed arrow as shown in Figure 2, is accomplished by the control system connected to the photo-electric cell 7.

The screening device should be so adapted, for example by means of the opening or notch in the screen 15 above the shoulder $k—i$, that the light which falls on the prism 6 is not affected by the said screening device, because otherwise a back-coupling or reaction takes place in the arrangement, which in most cases would cause instability of the entire installation.

The additional control device for the intended purpose may be made still more flexible by providing in known manner an output regulating device in the amplifier 11, thereby controlling the degree of movement of the armature. The same results may be obtained by means of any other resistance of an ohmic, capacitive or inductive nature inserted at any point in the path from the cell 7 to the armature 13.

Having now particularly described and ascertained the nature of my said invention, and in what manner the same is to be performed, I declare that what I claim is:—

1. Method of regulating the amplitude range in the reproduction of sound record films, comprising directing a single beam of light upon the record film, employing one portion of the beam after incidence upon the film for reproducing sound, and varying the quantity of light in said one portion inversely according to the light intensity in another portion of the beam after incidence of the latter upon the film.

2. An apparatus for reproducing sound from a sound record film comprising a source of light for illuminating the film, a screen device for modifying one part of the light which passes from said source to the film while another part of said light remains uninfluenced by the screen device, a photo-sensitive cell for receiving at least said one part after incidence upon the film and means controlled by said cell for the production of sound in accordance with the illumination of said cell, a photo-electric regulating device operated in accordance with variations of said other part after incidence upon the film, and means controlled by said regulating device for moving said screen device.

3. An apparatus for reproducing sound from a sound record film comprising a source of light for illuminating the film, a screen device for modifying one part of the light which passes from said source to the film while another part of said light remains uninfluenced by the screen device, a first photo-sensitive cell for receiving at least said one part after incidence upon the film and means controlled by said first cell for the production of sound in accordance with the illumination of said cell, a second photo-sensitive cell located in the path of at least a portion of said other part and operated in accordance with variations of said other part after incidence upon the film, and means controlled by said second cell for moving said screen device.

4. An apparatus for reproducing sound from a sound record film comprising a source of light for projecting a light beam of substantially constant and uniform intensity upon the film, a shutter for obstructing a greater or lesser portion of a first part of the beam between the source and the film while permitting another part of the beam to remain uninfluenced by the shutter, a first photo-sensitive cell for receiving the light of said first part of said beam after incidence upon the film and means controlled by said first cell for the production of sound in accordance with the illumination of said cell, a second photo-sensitive cell located in the path of at least a portion of said other part of said beam and operated in accordance with variations of said other part after incidence upon the film, and means controlled by said second cell for moving said shutter whereby to vary the quantity of light incident upon said film.

5. An apparatus for reproducing sound from a sound record film comprising a source of light for projecting a light beam of substantially constant and uniform intensity upon the film, a shutter for obstructing a greater or lesser portion of a first part of the beam between the source and the film while permitting another part of the beam to remain uninfluenced by the shutter, a first photo-sensitive cell for receiving the light of said first part of said beam after incidence upon the film and means controlled by said first cell for the production of sound in accordance with the illumination of said cell, a prism located in the path of said other portion of said light beam for deflecting a part of the light thereof after incident of said beam upon the film, a second photo-sensitive cell located in the path of the deflected portion of the light beam and operated in accordance with variations of said other part, and means controlled by said second cell for moving said shutter whereby to vary the quantity of light incident upon said film.

6. Method of regulating the amplitude range in the reproduction of sound record films comprising directing a single beam of light upon the record film, dividing the beam after incidence upon the film into two parts, employing one part of the beam for reproducing sound, and employing the other part of the beam for varying the quantity of light in said one part inversely according to the light intensity in said other part and without changing the intensity of the light in said other part of the beam.

HEINRICH KÖNEMANN.